United States Patent
Nagatsuka et al.

(10) Patent No.: US 7,225,403 B2
(45) Date of Patent: May 29, 2007

(54) DISPLAY SYSTEM WITH A DISPLAY HAVING A MEMORY CHARACTERISTIC AND A DISPLAY HAVING NO MEMORY CHARACTERISTIC, DISPLAY METHOD, AND DISPLAY PROGRAM

(75) Inventors: Ikutaroh Nagatsuka, Kanagawa (JP); Tsunemasa Mita, Kanagawa (JP); Daisuke Tsuda, Tokyo (JP); Minoru Koshimizu, Kanagawa (JP); Tsutomu Ishii, Kangawa (JP); Yasunori Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 593 days.

(21) Appl. No.: 10/653,656

(22) Filed: Sep. 3, 2003

(65) Prior Publication Data

US 2004/0196210 A1 Oct. 7, 2004

(30) Foreign Application Priority Data

Mar. 20, 2003 (JP) ............................. 2003-078911

(51) Int. Cl.
*A41F 9/00* (2006.01)
*G06F 3/00* (2006.01)
(52) U.S. Cl. ................. 715/700; 345/1.1; 345/1.3
(58) Field of Classification Search ................ 345/1.1, 345/1.2, 2.2, 2.3, 3.1, 3.3, 3.4, 901, 905, 345/173, 903; 178/18.01, 18.03, 19.01; 715/864, 715/750, 751, 753; 382/290, 301, 309, 310, 382/321
See application file for complete search history.

(56) References Cited

U.S. PATENT DOCUMENTS

| | | | | |
|---|---|---|---|---|
| 5,049,862 A | * | 9/1991 | Dao et al. | 345/179 |
| 5,847,698 A | * | 12/1998 | Reavey et al. | 345/173 |
| 6,628,244 B1 | * | 9/2003 | Hirosawa et al. | 345/2.3 |

FOREIGN PATENT DOCUMENTS

| | | |
|---|---|---|
| JP | A 5-249934 | 9/1993 |
| JP | A 6-83779 | 3/1994 |
| JP | A 9-26562 | 1/1997 |
| JP | A 2000-292777 | 10/2000 |

* cited by examiner

*Primary Examiner*—Kristine Kincaid
*Assistant Examiner*—Chris Watt
(74) *Attorney, Agent, or Firm*—Oliff & Berridge, PLC

(57) ABSTRACT

While names of data and icons are displayed on a selection-purpose display medium, a user selects data. Since the selection-purpose display medium is constituted by such a display medium capable of displaying a moving picture, operability by the user may be guaranteed. The content of the data which is selected by the selection-purpose display medium is displayed on a contents-display-purpose display medium. Since the contents-display-purpose display medium is constituted by a display medium having a memory characteristic, power consumption may be reduced, and this display medium having the memory characteristic may be dismounted. Since the display screen for the selection operation and the display screen for the contents display operation are separately provided, the user can perform the work by viewing the content of the data in correspondence with the data, so that the work efficiency can be increased.

11 Claims, 5 Drawing Sheets

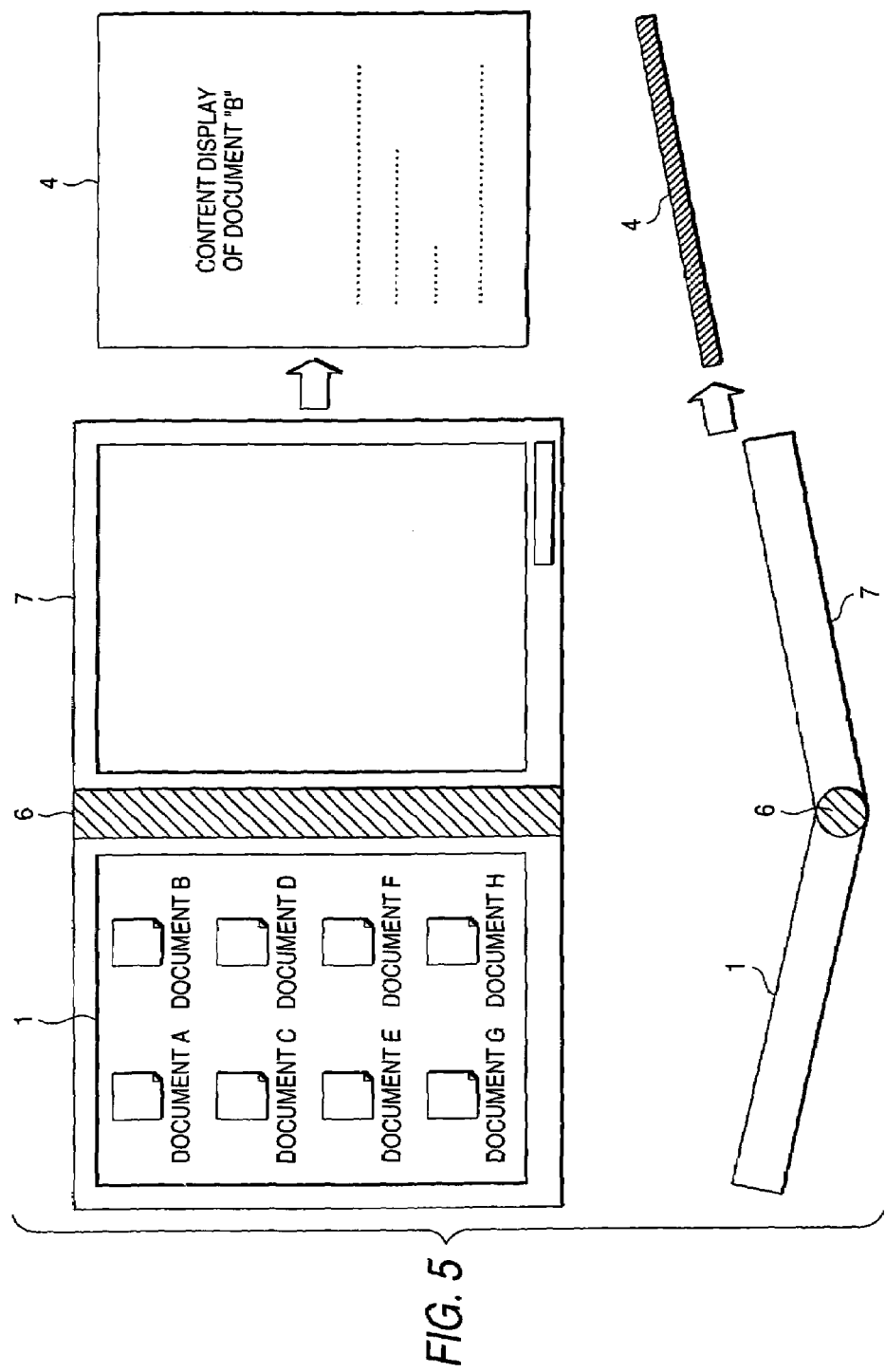

DISPLAY SYSTEM WITH A DISPLAY HAVING A MEMORY CHARACTERISTIC AND A DISPLAY HAVING NO MEMORY CHARACTERISTIC, DISPLAY METHOD, AND DISPLAY PROGRAM

BACKGROUND OF THE INVENTION

1. Field of the Invention

The present invention is related to a display system and a display method, capable of displaying/viewing data, and related to a display program.

2. Description of the Related Art

Conventionally, a large number of two-page spread type document terminals having a plurality of display media have been proposed. For instance, JP-A-6-083779, JP-A-5-249934 and JP-A-9-026562 describe such display apparatus in which display screens are arranged on right and left sides. A patent JP-A-2000-292777 describes such a display device in which a larger number of display media is connected to each other by way of a spindle. These conventional techniques focus on viewing the document. In order to establish both a portability and display performance of the display apparatus at the same time, various technical ideas have been made, for instance, a single document is displayed on two screens, and/or a document is enlarged to be displayed on one screen.

However, when a large number of document files are viewed on these conventional display terminals, since areas of display screens are limited, document selecting operations and document viewing operations must be selectively carried out in a switching manner on the same screen. Therefore, users can hardly grasp that a document which is presently displayed may correspond to which document file, so that operability is very deteriorated, and also, there is a difficulty to understand information.

In the conventional display apparatus as described in the above respective publications, a two-page spread type display screen is constituted by display media having the same display principles. For instance, both the display screens of the two-page spread form are constituted by LCDs having no memory characteristic. In the patent JP-A-2000-292777, both the display screens of the two-page spread form are constituted by liquid crystal display elements having memory characteristics.

In a display medium having no memory characteristic such as an LCD, a display content can be updated in a relatively higher speed, and thus, a moving picture may be displayed. To the contrary, this display medium cannot continuously display a data content without power supply, and thus, owns such a drawback that electric power is consumed in order to display the data content. In a display medium having a memory characteristic, although electric power is consumed when data is written thereinto, electric power is not required so as to continuously display the data content, and thus, this display medium can be handled without power supply. To the contrary, generally speaking, an updating speed of a data content in this display medium having the memory characteristic is slow, and thus, there are some trouble cases that a moving picture, for example, a mouse cursor is moved is displayed.

As previously described, while presently available display media employ various display principles, these display media own merits and demerits. However, since a plurality of display media having the same display principles are employed in the conventional display apparatus, only such displays are carried out in accordance with a characteristic of a specific display medium. As a result, such displays cannot be made by utilizing the characteristics of the respective display principles.

SUMMARY OF THE INVENTION

The invention has been made to solve the problems, and an object of the invention is to provide a display system capable of improving a work efficiency, and capable of being optimized in various purposes by utilizing characteristics of different display principles, a display method in the display system, and a display program.

According to a first aspect of the invention, there is provided a display system having a selection-purpose display medium used to select at least data and a contents-display-purpose display medium used to display a content of the data selected by the selection-purpose display medium.

According to a second aspect of the invention, there are provided, a display method with employment of a display system in which a plurality of display media are provided, and such a display program in which information used to select data is displayed on a predetermined display medium, the selection of the data is accepted in accordance with the information displayed on the predetermined display medium and a content of the data whose selection has been accepted is displayed on a display medium different from the predetermined display medium. For example, at least one of data names and icon names are displayed on the predetermined selection-purpose display medium and the content of the selected-data may be displayed on a contents-display-purpose display medium different from the predetermined selection-purpose display medium.

As previously described, since a document is selected in a predetermined selection-purpose display medium and a content of this document is displayed on another display medium, the user can readily grasp that the document content being displayed corresponds to which document, so that a work efficiency can be improved.

According to a third aspect of the invention, there is provided a display system having a first display medium and a second display medium which is different from the first display medium in display principle. As previously described, since the display system is arranged by a plurality of display media whose display principles are different from each other, data displays can be made by utilizing the respective characteristics of the display media having the respective display principles.

For example, as a plurality of display media, the display system may be arranged by a display medium having no memory characteristic and another display medium having a memory characteristic. As a result, as to such a display subject that a display content such as a moving picture must be updated in a high speed, this display content is displayed on a display medium having no memory characteristic, whereas as to such a display subject which must be continuously displayed, this display subject is displayed on a display medium having a memory characteristic. Thus, the display subjects can be displayed by effectively utilizing merits of both the display media having the memory characteristic and no memory characteristic. As a concrete example, as previously explained, the display system may be arranged in that the display medium having no memory characteristic is employed as a selection-purpose display medium used to select at least data and the display medium having the memory characteristic is employed so as to display a content of the data selected by the selection-purpose display medium.

If data has been once written into such a display medium having a memory characteristic, then a power supply is no longer required, so that the display medium having the memory characteristic is detachably mounted on a writing means for writing into the display medium. As a consequence, while the data as to the document content remains displayed, this display medium having the memory characteristic may be dismounted so as to be carried.

Furthermore, a plurality of display media maybe connected to each other in a two-page spread form. A plurality of display media may be connected to each other in a foldable form.

BRIEF DESCRIPTION OF THE DRAWINGS

FIG. 5 is an explanatory diagram for explaining such a display system in which the optical writing type film display is employed as the contents-display-purpose display medium, according to another embodiment of the present invention, when the optical writing type film display is dismounted.

DETAILED DESCRIPTION OF THE PREFFERED EMBODIMENTS

Figure 1:
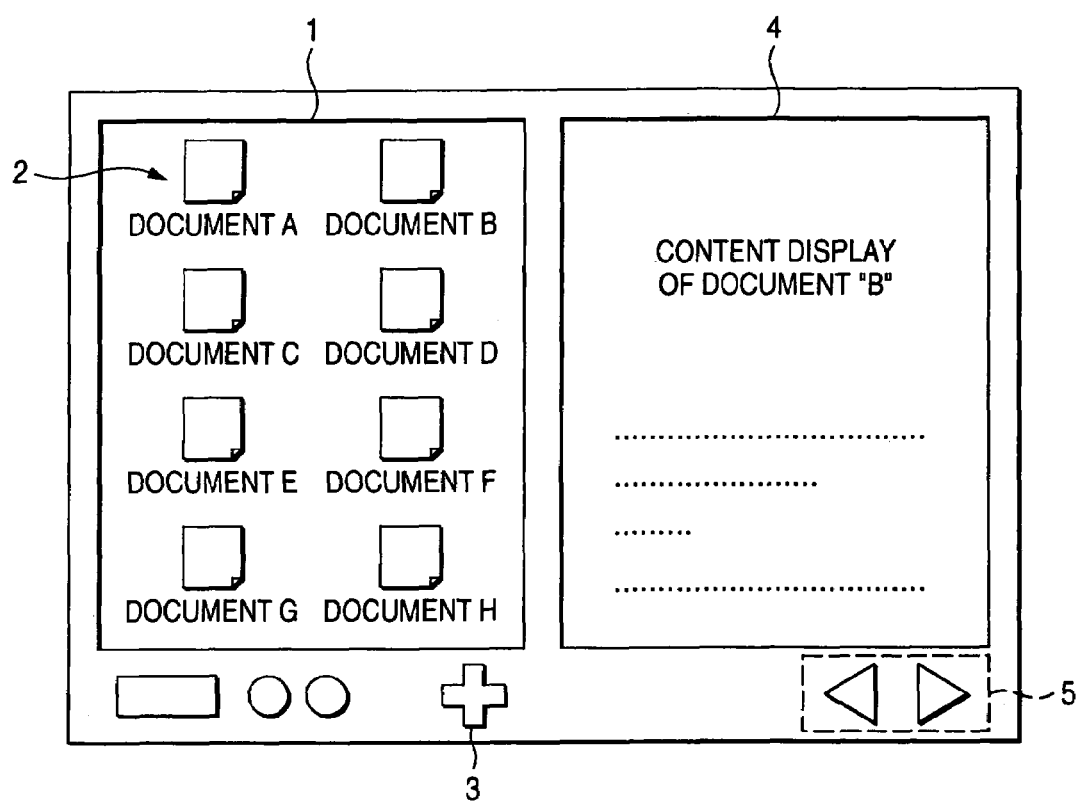
FIG. 1 is a structural diagram for showing a display system according to an embodiment of the present invention.

FIG. 1 is a structural diagram for schematically showing a display system according to an embodiment of the present invention. In this drawing, reference numeral 1 indicates a selection-purpose display medium, reference numeral 2 represents an icon, reference numeral 3 shows a cursor key, reference numeral 4 denotes a display medium for displaying contents, and reference numeral 5 shows a page-feeding key. In this embodiment shown in FIG. 1, two sets of display media are provided, namely both the selection-purpose display medium 1 and the contents-display-purpose display medium 4 are employed.

Names of data, icons indicative of the data, and the like are displayed on the selection-purpose display medium 1, and data may be selected from the selection-purpose display medium 1. In the example shown in FIG. 1, the names (document "A" to document "H") of the data and the icons 2 indicative of the respective documents "A" to "H" are displayed.

To select the data, for example, the cursor key 3 may be employed. Alternatively, a pen and the like may be used so as to select the data. Apparently, the present invention is not limited to these selection means, but various other selection means known in this field may be employed. The display system may be arranged without employing the cursor key 3.

In order that users do not have feelings of stress, while such data are selected, it is desirable that higher response speeds of displays are realized. For instance, in the case that data is inputted by using a pen, the display system desirably owns such a moving picture display function capable of displaying moves of a cursor which may follow moves of this pen. As a construction of the selection-purpose display medium 1 capable of realizing this moving picture display function, such general-purpose display media which is suitable to display moving pictures, e.g., a liquid crystal display medium and an EL panel may be utilized.

A content of such a data selected by the display-purpose display medium 1 is displayed on the contents-display-purpose display medium 4. In the example shown in FIG. 1, this example indicates such a condition that the document "B" is selected by the selection-purpose display medium 1, and the content of this document "B" (content display of document "B") is displayed on the contents-display purpose display medium 4.

As the contents-display-purpose display medium 4, such a display medium having a display principle may be employed which is optimum for a data display. Generally speaking, for instance, when a general-purpose office document, a still picture image, and a graphic image are displayed on the display system, such a display medium may be normally employed which is capable of maintaining displays of these document/images to a certain degree. As a result, there are many cases that a display of moving pictures is not required. Conversely, a displayed content may desirably and directly remain maintained. In this case, a display medium having a memory characteristic may be applied as the contents-display-purpose display medium 4. For instance, various sorts of display media having memory characteristics known in this technical field may be applied to the contents-display-purpose display medium 4, which are known as a toner display, an electrophoresis display, and an optical writing type electronic paper. If writing operation has been once carried out with respect to these display media, then a supply of electric power for maintaining displays is no longer required, so that power consumption can be saved. In portable type display devices, operation time thereof can be prolonged due to power saving. Otherwise, these portable type display devices may be made compact and in light weight. Obviously, when data to be displayed correspond to moving pictures, such a display medium suitable for the moving pictures maybe utilized as the contents-display-purpose display medium 4.

It should be noted that when data (document) selected in the selection-purpose display medium 1 contains a plurality of pages in the example shown in FIG. 1, the page-feeding key 5 is employed so as to change pages to be displayed on the contents-display-purpose display medium 4. Either a content of a preceding page or a content of a succeeding page may be displayed by manipulating this page-feeding key 5.

As previously described, since the selection-purpose display medium 1 is separatedly provided with respect to the contents-display-purpose display medium 4, the content of the data can be viewed by using the contents-display-purpose display medium 4. Furthermore, the user can confirm that the data content under display corresponds to which data content by using the selection-purpose display medium 1. As a consequence, the user can immediately grasp the corresponding relationship between the data and the content thereof, so that the work efficiency can be improved. The user need not perform such a conventional operation that both the selecting operation of the data and the viewing operation of the content thereof have been switched on the same screen. Even when the user need not continuously switch the display screen, the data management such as the selection, move, and deletion of the data can be carried out, so that the operability and the work efficiency can be improved.

It should also be understood that in the example shown in FIG. 1, two sets of the display media have been arranged in the two-page spread manner, but the present invention is not limited thereto. For instance, three sets, or more sets of display media may be arranged. In this alternative case, the display principles of the respective display media need not be made coincident with each other. Thus, display media having such display principles which own optimum characteristics for displaying the respective data may be applied.

As previously described, the following functions may be executed by a computer, for example, a CPU built in the display system. That is, as the above-described functions, while the information used to select the desirable data, e.g., the names of data and the icons indicative of the data is displayed on the selection-purpose display medium 1, the selection instruction made by the user is accepted with reference to the information displayed on the selection-purpose display medium 1, and then, the content of the data whose selection has been accepted is displayed on the contents-display-purpose display medium 4. At this time, in order to realize the above-described function, a display program can be provided. This display program may be previously stored in an internal memory. In addition, this display program may be installed in such a manner that this display program may be transmitted from an external source via either a wired communication path or a wireless communication path, or a storage medium of this display program is mounted on the display system.

Figure 2:
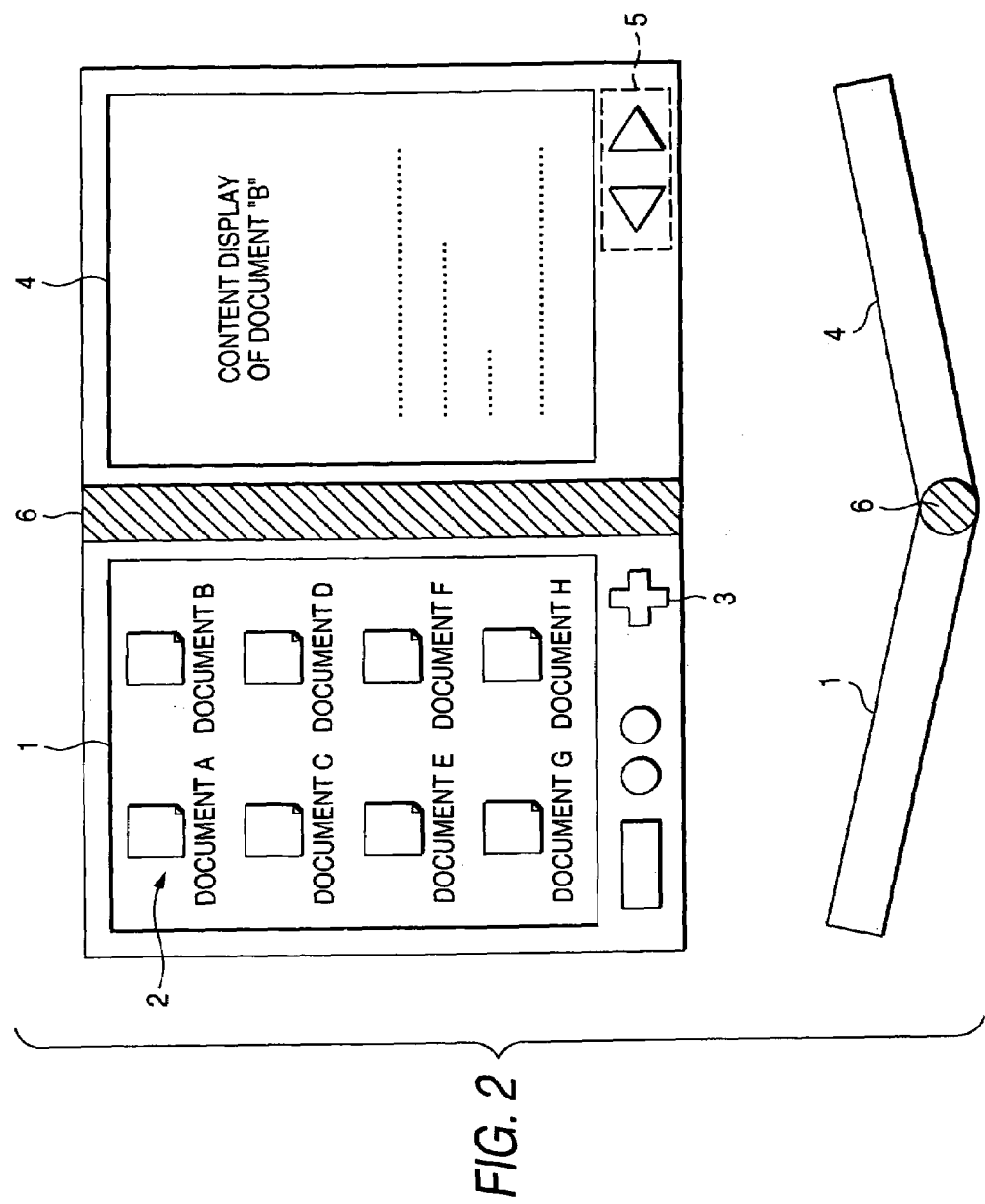
FIG. 2 is a structural diagram for representing an example of the display system in which a contents-display-purpose display medium is detachably mounted in the embodiment of the present invention.
Figure 3:
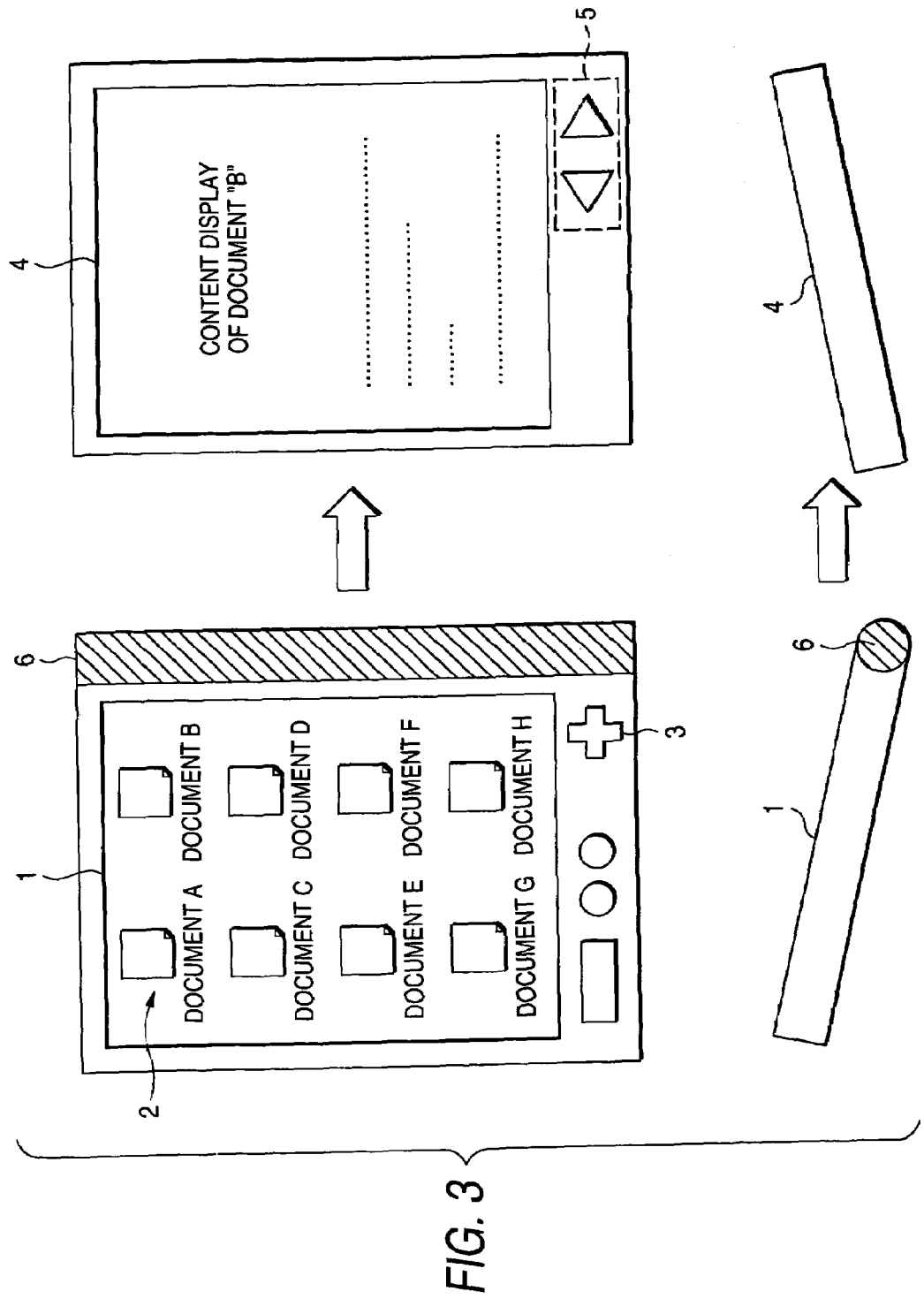
FIG. 3 is an explanatory diagram for explaining the medium detachable display system from which the contents-display-purpose display medium is dismounted according to the embodiment of the present invention.

FIG. 2 is a structural diagram for indicating an example of a detachable display system according to an embodiment of the present invention. FIG. 3 is an explanatory diagram for explaining conditions of the display system when a contents-display-purpose display medium 4 is dismounted. In the drawings, reference numeral 6 shows a connection portion.

FIG. 2 represents such a structural example that a selection-purpose display medium 1 is connected to the contents-display-purpose display medium 4 by employing the connection portion 6. The connection portion 6 electrically connects the selection-purpose display medium 1 to the contents-display-purposed is play medium 4, and further, connects both the display media 1/4 in a pivotable manner, so that the selection-purpose display medium 1 and the contents-display-purpose display medium 4 can be folded by pivotally moving these display media 1/4.

In this structural arrangement, as shown in FIG. 3, the contents-display-purpose display medium 4 is detachably arranged at the connection portion 6. For instance, in the case that such a display medium having a memory characteristic is employed as the contents-display-purpose display medium 4, after data to be displayed has been written into this contents-display-purposed is play medium 4 and has been displayed, the contents-display-purpose display medium 4 may be dismounted from the connection portion 6, and thus may be carried. When the display medium having the memory characteristic is employed as the contents-display-purpose display medium 4, even after this display medium has been dismounted, the data display may be maintained under no power supply condition. As a result, the user can refer to the data any time.

As apparent from the foregoing description, if both a battery and a memory are mounted on the contents-display-purpose display medium 4, then the data under display may be updated only by using the contents-display-purpose display medium 4. When the contents-display-purpose display medium 4 is equipped with a battery, even such a display medium having no memory characteristic may maintain a data display. However, display time by this display medium having no memory characteristic is considerably shorter than display time by a display medium having a memory characteristic.

Since the contents-display-purpose display medium 4 is detachably mounted on the display system, the following utilization thereof may be realized. That is, for example, while plural sheets of such contents-display-purpose display media are prepared, certain data may be written into a certain contents-display-purpose display medium 4, whereas another data may be written into another contents-display-purpose display medium 4.

Figure 4:
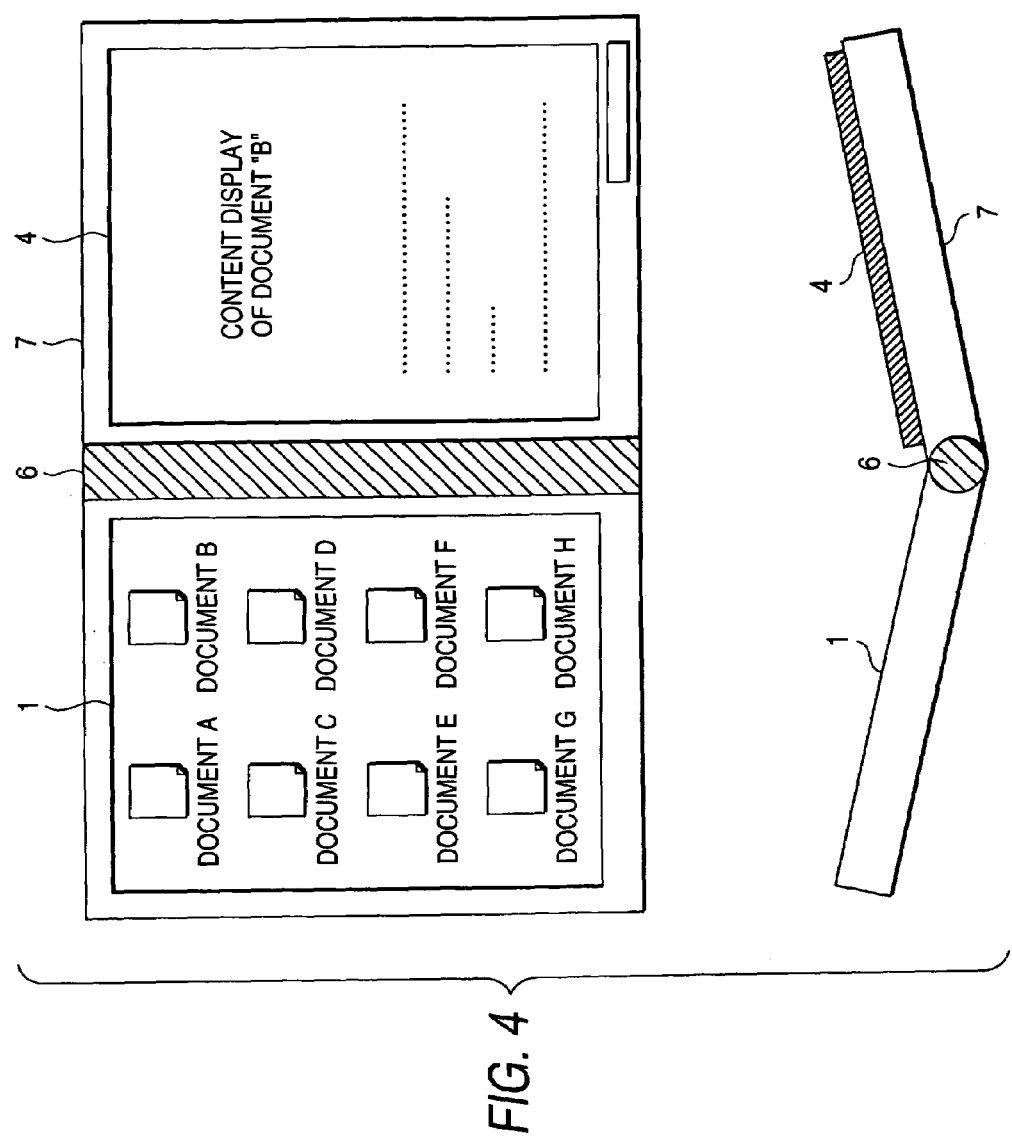
FIG. 4 is a structural diagram for indicating a display system in which an optical writing type film display is employed as a contents-display-purpose display medium, according to another embodiment of the present invention.

FIG. 4 is a structural diagram for indicating an example of a display system, according to an embodiment of the present invention, with employment of an optical writing type film display as a contents-display-purpose display medium. FIG. 5 is an explanatory diagram for explaining the display system in the case that the optical writing type film display is dismounted.

In the drawings, reference numeral 7 shows a writing unit. More specifically, this example represents such a case that the optical writing type film display is employed as the contents-display-purpose display medium 4. In such an optical writing type film display, a content to be displayed must be irradiated by light. As a result, in this example, the writing unit 7 is arranged on a rear surface of the contents-display-purpose display medium 4. As the writing unit 7, various sorts of light emitting type display devices may be employed, for example, a light emitting type EL display device, or the like may be employed.

The optical writing type film display which is employed as the contents-display-purpose display medium 4 is mounted on this writing unit 7, and this writing unit 7 is electrically connected to the optical writing type film display in order to apply a writing voltage to this optical writing type film display. Then, when the user selects data from the selection-purpose display medium 1 and instructs data writing operation, a voltage is applied to the optical writing type film display, and also, the writing unit 7 emits light in response to the selected data, so that an image of this selected data is written into the optical writing type film display. Then, the data writing operation is instantaneously accomplished. Thereafter, while the application of the voltage and the light emission are not required, the data can be continuously displayed under no power supply condition. As a consequence, while the contents-display-purpose display medium 4 can be driven by very small power consumption, the operation time can be prolonged, or since the battery can be made small, the housing of this display system can be made compact and in light weight. Apparently, since the light emitting pattern of the writing unit 7 is changed and the writing voltage is applied to the optical writing type film display, the display may be temporarily changed in such a manner that the pages are turned over.

As shown in FIG. 5, since the optical writing type film display owns the memory characteristic, which is employed as the contents-display-purpose display medium 4, this optical writing type film display may be separated from the writing unit 7 so as to be carried. In this case, the data display may also be maintained under no power supply.

Alternatively, plural sets of such optical writing type film displays are prepared which are employed as the contents-display-purposed is play medium 4, and then, data of plural pages may be sequentially written into the plural optical writing type film displays while these optical writing type film displays are successively replaced by each other with having a feeling of print-out operation. Alternatively, the same data may be written into plural sets of optical writing type film displays.

It should also be noted that since the writing unit 7 itself owns the display function, the writing unit 7 may be utilized as the contents-display-purpose display medium 4 under such a condition that the optical writing type film display is not mounted. In this alternative case, the display driving methods may be controlled in such a manner that the display driving method used when the data is written into the optical writing type film display is different from that used when the data content is read from the optical writing type film display.

Similar to the examples indicated in FIG. 2 and FIG. 3, in the above-described examples shown in FIG. 4 and FIG. 5, both the selection-purpose display medium 1 and the writing unit 7 are pivotably connected to each other at the connection unit 6, and also, are electrically connected to each other at this connection unit 6. In this construction, since this optical writing type film display is detachably mounted which is employed as the contents-display-purpose display medium 4, the writing unit 7 need not be detachably constructed. Apparently, the writing unit 7 may be detachably constructed. Further, both the writing unit 7 and the selection-purpose display medium 1 may be formed in an integral form.

In the above-descriprion, the data is selected on the selection-purpose display medium 1, and then, the content of this selected data is displayed on the contents-display-purpose display medium 4. However, the content to be displayed on the contents-display-purpose display medium 4 is not limited only to such a content of the data which is directly selected by the selection-purpose display medium 1. Alternatively, a content of data which is adapted by designating, for example, a condition may be displayed. Also, a result processed by soft ware maybe displayed on the contents-display-purpose display medium 4.

In the above description, as the concrete example, such an example has been explained. That is, the display medium capable of displaying the moving picture is applied to the selection-purpose display medium 1, whereas another display medium having the slow display updating speed is applied to the contents-display-purpose display medium 4. However, the present invention is not limited only to this concrete example.

For instance, as in such a case that selected data corresponds to moving picture data, when the moving picture display is required so as to display the data content, such a display medium capable of displaying the moving picture may be applied as the contents-display-purpose display medium 4. In this alternative case, if the data is merely selected by using key, then the display medium having the slow display updating speed may be employed as the selection-purposed is play medium 1. For example, this concrete example may correspond to such a case that a title such as a movie is displayed and a content of this movie is viewed. Another utilizing method may be conceived. That is, for example, while a map and a status of a game are displayed by employing a display medium having a slow display updating speed, whereas an enlarged drawing is displayed in real time and a moving picture scene is displayed by employing such a display medium capable of displaying a moving picture.

Furthermore, in the above description, as the display media having the different display principles, both the display medium having the memory characteristic and the slow display speed, and the display medium having no memory characteristic and capable of displaying the moving picture are employed as one example. However, the present invention is not limited only to this example, but may be similarly applied to such a display system that display media whose display principles are different from each other is employed. It is possible to achieve the display system by effectively utilizing the features of the respective display principles.

As apparent from the above descriptions, according to the present invention, since the selection screen of the data is separated from the view screen of the data content, the user can refer to the content in correspondence with the data, and also can execute various sorts of operations while referring to the content thereof, so that the work efficiency can be improved.

In the display system of the present invention, since the display media whose display principles are different from each other is provided, various sorts of displays can be realized while the characteristics of the respective display principles can be effectively utilized. For example, since such a display medium having a memory characteristic is employed as the contents-display-purpose display medium, this display medium can be detachably mounted and the power consumption can be reduced.

For example, since such a display medium whose response characteristic is relatively fast is employed as the selection-purpose display medium, operability of the user can be maintained. In accordance with the present invention, the above-described various sorts of effects may be achieved.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention.

The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A display system comprising:
a selection-purpose display medium used to select at least data; and
a contents-display-purpose display medium used to display a content of the data selected by the selection-purpose display medium,
wherein the selection-purpose display medium comprises a display medium having no memory characteristic,
the contents-display-purpose display medium comprises a display medium having a memory characteristic, and
the display medium having memory characteristic sustains a display without supplying power for sustaining a display.

2. The display system according to claim 1,
wherein at least one of data names and icon names is displayed on the selection-purpose medium; and
the content of the selected-data is displayed on the contents-display-purpose display medium.

3. The display system according to claim 1,
wherein the selection-purpose display medium and the contents-display-purpose display medium are connected to each other in a two-page spread form.

4. The display system according to claim 1,
wherein the selection-purpose display medium and the contents-display-purpose display medium are connected to each other in a foldable form.

5. A display system comprising:
a first display medium; and
a second display medium which is different from the first display medium in display principle,
wherein one of the first display medium and the second display medium comprises a display medium having no memory characteristic,
the other display medium comprises a display medium having a memory characteristic, and
the display medium having a memory characteristic sustains a display without supplying power for sustaining a display.

6. The display system according to claim 5,
wherein the display medium having no memory characteristic is employed as a selection-purpose display medium used to select at least data, and
the display medium having the memory characteristic is employed so as to display a content of the data selected by the selection-purpose display medium.

7. The display system according to claim 5, further comprising a writing device for writing into the display medium,
wherein the display medium having the memory charactenstic is detachably mounted on the writing device.

8. The display system according to claim 5,
wherein the first display medium and the second display medium are connected to each other in a two-page spread form.

9. The display system according to claim 5,
wherein the first display medium and the second display medium are connected to each other in a foldable form.

10. A display method for a display system having a plurality of display media, comprising:
displaying information used to select data on a predetermined display medium, the predetermined display medium having a memory characteristic;
accepting a selection of data in accordance with the information displayed on the predetermined display medium; and
displaying a content of the data whose selection has been accepted on another display medium different from the predetermined display medium, the another display medium having no memory characteristic,
wherein the display medium having a memory characteristic sustains a display without supplying power for sustaining a display.

11. A display program recorded on a computer-readable medium for causing a computer to execute a process for displaying data by using a display system in which a plurality of display media are provided, the program causing the computer to realize the function of:
displaying information used to select data on a predetermined display medium, the predetermined display medium having a memory characteristic;
accepting the selection of the data executed in accordance with the information displayed on the predetermined display medium; and
displaying a content of the data whose selection has been accepted on another display medium different from the predetermined display medium, the another display medium having no memory characteristic,
wherein the display medium having a memory characteristic sustains a display without supplying power for sustaining a display.

* * * * *